April 29, 1958 G. F. WITTGENSTEIN 2,832,508
SEED-SOWING MACHINES
Filed March 30, 1955 2 Sheets-Sheet 1
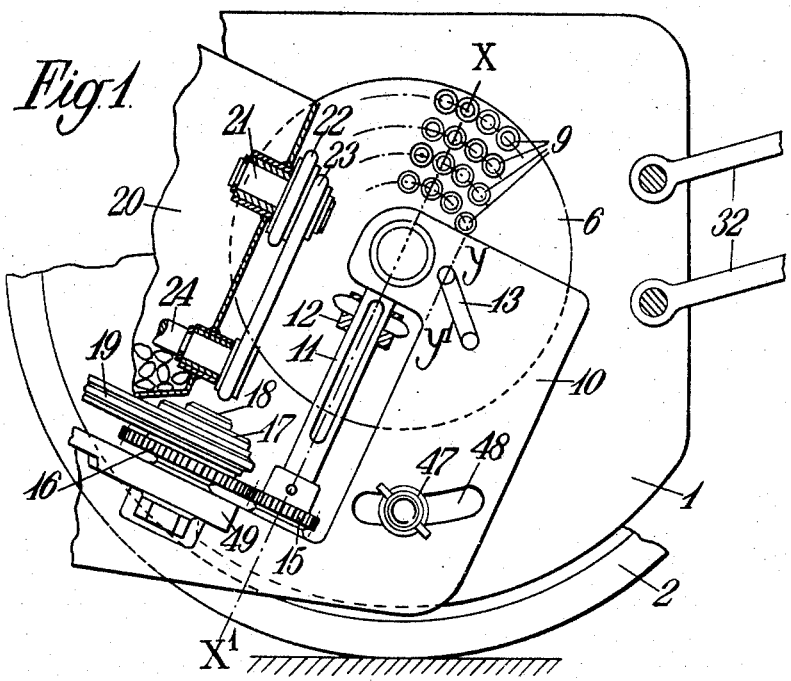
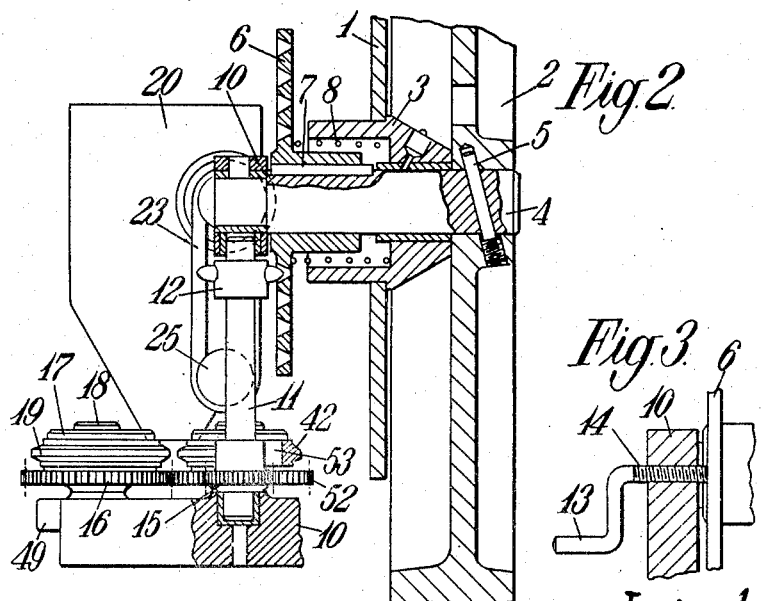
Inventor:
Gérard Francis Wittgenstein
by Eugene A. Purdy
Attorney April 29, 1958     G. F. WITTGENSTEIN     2,832,508
SEED-SOWING MACHINES
Filed March 30, 1955     2 Sheets-Sheet 2
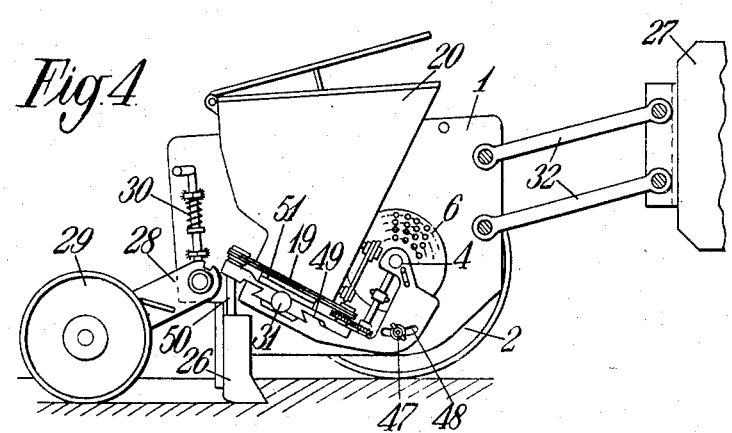
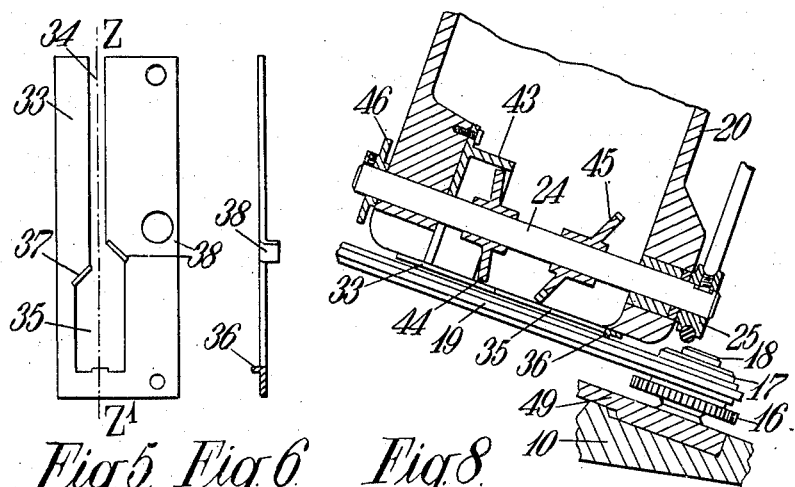
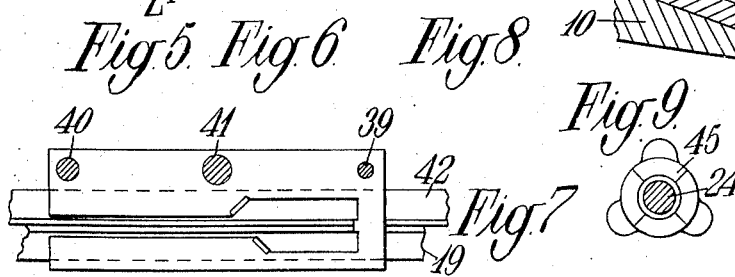
Inventor:
Gérard Francis Wittgenstein
by Eugene N. Purdy
Attorney

United States Patent Office 2,832,508
Patented Apr. 29, 1958

2,832,508

SEED-SOWING MACHINES

Gérard Francis Wittgenstein, Lausanne, Switzerland

Application March 30, 1955, Serial No. 498,028

Claims priority, application Switzerland July 1, 1954

9 Claims. (Cl. 222—41)

The present invention relates to improvements in or modifications of the seed-sowing machine described or claimed in my prior patent specification No. 309,990, now Patent No. 2,753,819, issued July 10, 1956.

It concerns mechanical devices the aim of which is to adapt the seed-sowing machine, quickly and conveniently, to very different seeds, and also to sloping ground, to control permanently the satisfactory running of the various devices, to regulate the spacing of the seeds quickly and conveniently, and to improve the regularity.

It is known already from my prior specification that the seed-conveyor consists essentially of two flexible endless belts resiliently stretched in the same inclined plane over revolving drums, and forming together a transporting channel of adjustable width. The present invention describes a novel device for regulating the width of the channel, and also a construction enabling the inclination of the conveyor to be regulated as an inverse function of the coefficient of friction or rolling of the seeds. Round and polished seeds, for example, which roll easily, will be transported by a conveyor of less inclination than rough or wrinkled seeds. The inclination selected will also be a function of the slope of the ground. It has been found that the small equalizing roller of the earlier invention, when it impels the seeds in the longitudinal direction of the channel, is liable to occasion gaps in the chain of seeds. According to the present invention, the equalizing wheel, preferably of a flexible material, turns upon an axis parallel to the chain, and therefore acts only upon seeds that are superposed upon those of the chain, pushing them obliquely. This modified wheel which is preferably elliptical in shape, equalizes the delivery of seeds, and will therefore be called an equalizer.

Along the transporting channel it is convenient to distinguish a broad charging zone and a narrow transporting zone. In the former, situated entirely underneath the hopper, the seeds fall abundantly into the channel, and are stirred about by the agitator, and lightly brushed by the upper wall of the belts. The transporting zone is situated partially beneath the hopper; in the section thereof situated between the charging zone and the equalizer, the excess seeds slip or roll backwards towards the charging zone, either by the action of gravitation, owing to the inclination of the channel, or owing to the action of the equalizer. Beyond the latter the chain of seeds is constituted. An intermediate wall, preferably circular, and obturated by the equalizer, is so arranged in the hopper as to cover the transporting zone beyond the equalizer. Interchangeable gauges or templates are suitably cut out and arranged above the belts, creating the said zones by the shapes to which they are cut, and preventing seeds rolling backwards by virtue of a tooth penetrating into the transporter channel.

Another feature of the invention relates to the device transmitting motion from the supporting wheel of the machine to the conveyor belts and to other moving members. A circular plate, pierced with rings of holes, is impelled by the driving shaft of the supporting wheel, while a pinion bearing suitably designed teeth and co-operating with a grooved shaft perpendicular to the driving shaft, meshes with any one of these rings of holes, its speed of revolution increasing with the diameter of the driving ring. To modify this speed, that is to say, to vary the spacing of the seeds, all that is necessary is to push back the circular plate against the action of a compression spring, thereby disengaging the pinion, displace the latter along its shaft, and re-engage it with a different ring of holes. Upon the shaft of the pinion is arranged a wheel, which meshes with that of a stretching drum of one of the conveyor belts, this latter wheel also meshing with a gear wheel of the drum of the other belt.

In order to set in motion the shaft that carries the agitator and the equalizer, a friction wheel is arranged between two of the rings of holes in the plate, and motion is transmitted from this friction wheel to the said shaft by means of a belt.

It is already known that the conveyors and the equalizer may be made of flexible material, such as indiarubber, and it is advantageous for the agitator also to be flexible. It will therefore either be constituted of flexible material, or will be in the form of a spiral spring coiled around the shaft in the direction opposite to the direction of rotation, in such a manner that the free end of the spiral yields to bending stress if it encounters an obstacle, such as a bridge of seeds.

A particularly advantageous form of agitator of flexible material is constituted by a flexible disc the plane of which is not perpendicular to the axis of the rotating shaft that drives it. The disc consequently generates, when rotating, a barrel-shaped surface so that the seeds situated within this surface are stirred obliquely. If the disc is furthermore equipped with flexible peripheral fins or wings, these insinuate themselves, during rotation, between the seeds, thereby increasing the effectiveness of the stirring.

The rotating shaft upon which the agitator and the equalizer are fixed may advantageously be provided with a colored verification indicator, which enables the rotation to be verified from the exterior. In this case it is sufficient that the shaft should be prolonged beyond the hopper into the region of the point of liberation of the seeds.

Behind a tractor or fore-carriage there may be arranged as many individual sowing machines as there are lines to be sown. The sowing machine may alternatively be provided with handles so that it can be propelled by hand.

Other features of the invention will appear from the following description of some forms of construction of the invention given by way of example in the accompanying drawings in which:

Figure 1 shows in side elevation the members that generate the movements of the sowing machine;

Figure 2 shows a section on the line X—X' in Figure 1;

Figure 3 shows a section on the line Y—Y' in Figure 1;

Figure 4 is a general view of the machine in side elevation;

Figure 5 is a view of a gauge or template;

Figure 6 shows a section on the line Z—Z' in Figure 5;

Figure 7 is a plan view of the template in position in the sower;

Figure 8 shows a section of the hopper; and

Figure 9 is a view of the agitator.

On referring to these figures, at 1 is seen the frame of the machine, at 2 the supporting wheel, at 3 its hub, at 4 the driving shaft, at 5 a pin securing the wheel 2 to the shaft 4, at 6 a plate with several concentric rings of holes 9, at 7 a key securing the plate 6 to the shaft 4, and at 8 a compression spring interposed between the hub 3 and the plate 6. At 10 is shown a bracket, articulated about the shaft 4. This bracket is provided with an arcuate slot 48. 47 is a nut on a screw passing through the slot 48 to enable the bracket to be fixed at the desired inclination. At 11 is seen a grooved shaft, which carries a pinion 12 which can mesh with any one of the rings of holes 9. At 13 is seen a crank, the shaft of which is provided with a thread 14, which screws into a tapped hole in the bracket 10. The end of the shaft bears against the plate 6, so that by turning the crank the plate is pushed back against the action of the compression spring 8, whereby the pinion 12 is disengaged from the holes 9. 15 is a pinion meshing with a toothed wheel 52, which co-operates with a drum 53. Round this drum passes a flexible and elastic conveyor belt 42, of special section. The belt 42 is guided forward by a second drum analogous to the drum 53, and fixed, like the latter, upon the bracket 10. A conveyor belt 19 passes round a drum 17, on a shaft 18, which co-operates with a toothed wheel 16. This wheel 16 meshes with the wheel 52, and turns in the opposite direction. The shaft 18 co-operates with a shoe 49, which rests upon the bracket 10 and can slide in a slideway. The belt 19 is guided forward by a second drum analogous to the drum 17, and mounted, like the latter, upon the shoe 49.

51 denotes guiding fingers fixed severally to the bracket and to the shoe, and penetrating into the lower channel of the conveyor belts in order to effect the linear guidance thereof.

20 is the hopper which is fixed on to the bracket 10. In the wall of the hopper is journalled a shaft 21 carrying a friction pulley 22 and a transmission belt 23, which rotates a shaft 24 through the medium of a pulley 25.

In Figure 4 is furthermore seen a tubular chute 50 for the seeds, a share 26, an arm 28 carrying a sealing wheel 29, a device 30 for locking the sealing wheel, the head 31 of a screw for regulating the spacing, and a coupling 32 which enables the sowing machine to be connected to a fore-carriage or tractor 27.

Referring to Figures 5, 6 and 7, 33 is the gauge plate or template, in which 34 is a slot located above the channel and 35 the charging zone. 36 is a tooth which prevents the escape of seeds through the back of the conveyor channel. 37 and 38 are two staggered baffles; 39 and 40 are two positioning spurs, preferably differing in diameter from one another; 41 shows in section a rod which fixes the hopper to the bracket 10; and 19 shows the conveyor belt co-operating with the shoe 49; while 42 is the conveyor belt co-operating with the bracket, the juxtaposition of these two belts forming the channel of the conveyor.

Figure 8 shows several of the parts already mentioned, and also shows the partition 43. On the shaft 24 is shown the equalizer 44, at 45 the agitator, and at 46 the colored verification indicator, mounted on and turning with the equalizer shaft outside the hopper.

Figure 9 shows in plan the agitator, in which segments have been cut out in such a way that the hub will be equipped with peripheral fins, which will sweep the surface of the gauge.

An indexed dial 31 (Figure 4) controls a screw which passes through a nut fixed to the shoe 49, while the extremity of the screw turns in a notch in the bracket 10. Hence the rotation of the dial controls the sliding of the shoe, and thus permits easy and exact regulation of the breadth of the channel constituted by the conveyor belts 19 and 42. The screw controlled by the dial 31 may also be screwed in the bracket against the action of an antagonistic spring, and may carry the shoe along in its advancing or recoiling movement by means of a tappet.

A handle that surmounts a rod 30 renders it possible to rock the sowing machine to empty the hopper, the cover of which opens of itself when the sowing machine is rocked. By exerting a pull on the above mentioned handle the sealing wheel 29 is also rocked, and by the mechanism 30 the arm 28 is locked. After this, if the sower is attached by its coupling, it rolls, on a road for example, on the rear wheel 29 and the supporting wheel 2 is neutralized.

In order not to overload the drawings, the shaft 11 and the spindle of the drum 53 have not been extended beyond the bracket 10 but it is easy to construct these members in such a way as to arrange a toothed wheel on each of these prolongations. These two toothed wheels may be interchangeable. If it is desired to utilize this train, the wheel 15 is remounted upon the shaft 11 in such a way that this wheel becomes inoperative. By this conjugate arrangement, with a plate 6 having four rings of holes 9 the sowing machine permits of twelve different spacings of the seeds. In the drawings an internal shaft 24 has been illustrated which has a rotational movement, but by placing upon the driving shaft 4 a cam or a connecting-rod crank, it is also possible to give the internal shaft, and the members that it carries, a reciprocating motion.

In the drawings, the baffles 37 and 38 of the gauges 33 have been given the appearance of protuberances which prevent the seeds that are not in the chain from leaving the charging zone 35 and assuming a position upon the blades of the gauge which border the channel in the transport zone. The shape of these protuberances is such that the excess seeds that are carried along strike against these baffles, which push them back towards the channel, to fill up any gaps in the chain of seeds.

The gauges 33 are inserted between the bottom of the hopper 20 and a laterally extending portion of the bracket 10, and are gripped between these members owing to the gripping of the hopper by means of the fixing rod 41. The gauges are interchangeable, and may be of different thicknesses. The greater the thickness selected, the farther will the axis of the equalizer 44 be from the channel of the conveyor. This is why thick gauges are selected when the seeds to be sown are of large dimensions.

For certain seeds of very small dimensions, the channel of the conveyor is constituted simply by two bevels of the belts.

For other seeds, which it is convenient to sow in pockets, one of the conveyor belts has regularly spaced protuberances which fill the channel between the two belts, so that in this way the channel, and therefore the chain of seeds, are discontinuous.

I claim:

1. A seed-sowing machine, comprising: a machine frame, a driving shaft journaled in the machine frame, at least one supporting wheel, mounted fast on the driving shaft and supporting the driving shaft and the machine frame, a seed hopper formed with a longitudinal slot in its base, a gauge plate situated beneath the seed hopper, the gauge plate being formed with a longitudinal slot substantially registering with the longitudinal slot in the base of the hopper, a seed channel immediately underneath the slot in the gauge plate, the initial portion of the slot in the gauge plate being relatively wide, to serve as a charging zone, and the further portion of this slot being narrower than the charging zone, and only slightly wider than the seed channel, an equalizer shaft passing right through the hopper parallel to the seed channel, mechanism communicating rotary motion from the driving shaft to the equalizer shaft, at least one flexible rotary agitator member secured to the equalizer shaft above the charging zone in a plane inclined to the axis of the shaft, a further flexible rotary member secured to the equalizer shaft above the narrower portion of the slot in the gauge plate, the periphery of this latter flexible rotary member approximately reaching the slot in the gauge plate, and a partition in the hopper, which, in conjunction with this latter flexible rotary member, shuts off the hopper from the narrower portion of the slot in the gauge plate.

2. A seed-sowing machine as claimed in claim 1, further comprising: four rotatably mounted drums, mechanism communicating rotary motion from the driving shaft to the drums, two flexible endless belts located underneath the gauge plate and each passing round two of the drums, the belts having adjacent straight portions which together form a seed-conveyor and which are so shaped as to constitute the seed channel, the said seed channel, the gauge plate and the base of the hopper being in upwardly inclined parallel planes.

3. A seed-sowing machine as claimed in claim 1, further comprising a colored verification indicator, mounted on and turning with the equalizer shaft outside the hopper.

4. A seed-sowing machine as claimed in claim 1, the mechanism communicating rotary motion from the driving shaft to the equalizer shaft comprising: a plate mounted fast upon the driving shaft, a friction wheel journaled in the side of the hopper and bearing against the said plate, belt pulleys mounted on the friction wheel and on the equalizer shaft, and a driving belt passing round these belt pulleys.

5. A seed-sowing machine as claimed in claim 2, further comprising: a bracket oscillatably mounted on the driving shaft, the hopper being fixed to the said bracket, and the two drums round which one of the endless belts passes being mounted on this bracket, and a shoe carrying the two drums round which the other endless belt passes, this shoe being so mounted on the bracket as to be slidable thereon in such a direction as to vary the width of the seed channel by varying the distance between the adjacent straight portions of the two belts.

6. A seed-sowing machine as claimed in claim 5, the gauge plate being exchangeably gripped between the base of the hopper and a laterally extending portion of the bracket.

7. A seed-sowing machine as claimed in claim 1, further comprising a downwardly projecting tooth on the gauge plate at the rear end of the charging zone, adapted to prevent the escape of seeds in a rearward direction.

8. A seed-sowing machine as claimed in claim 5, the bracket being formed with an arcuate slot concentric with the driving shaft, and the machine further comprising a screw-threaded stud projecting from the machine frame through the said arcuate slot, and a nut on the said screw-threaded stud, for locking the bracket to the machine frame after adjustment to the desired inclination.

9. A seed-sowing machine as claimed in claim 5, further comprising a manually adjustable screw for sliding the shoe on the bracket so as to vary the width of the seed channel, the head of the screw being formed as an indexed dial indicating the width of the seed-conveyor as adjusted by turning the screw.

References Cited in the file of this patent
UNITED STATES PATENTS

| | | |
|---|---|---|
| 445,734 | Schofield | Feb. 3, 1891 |
| 717,548 | Dann et al. | Jan. 6, 1903 |
| 2,311,726 | Blue | Feb. 23, 1943 |
| 2,668,638 | Joy | Feb. 9, 1954 |